US006887288B2

(12) United States Patent
Hokkirigawa et al.

(10) Patent No.: US 6,887,288 B2
(45) Date of Patent: May 3, 2005

(54) SUPERFINISHING GRINDSTONE

(75) Inventors: Kazuo Hokkirigawa, Sendai (JP); Motoharu Akiyama, Miyota-Machi (JP); Noriyuki Yoshimura, Miyota-Machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/453,158

(22) Filed: Jun. 3, 2003

(65) Prior Publication Data

US 2004/0033766 A1 Feb. 19, 2004

(30) Foreign Application Priority Data

Jun. 5, 2002 (JP) ..................................... 2002-164982

(51) Int. Cl.⁷ .............................. D24D 3/00; B24D 3/14
(52) U.S. Cl. .............................. 51/298; 51/293; 51/296; 51/307; 51/308; 51/309; 51/303
(58) Field of Search ......................... 51/293, 296, 298, 51/307, 308, 309, 303

(56) References Cited

U.S. PATENT DOCUMENTS

| | | |
|---|---|---|
| 2,956,841 A | 10/1960 | Cametti et al. |
| 4,049,464 A | 9/1977 | Tutsek et al. |
| 4,115,283 A | 9/1978 | Needham |
| 4,196,013 A | 4/1980 | Dannenberg et al. |
| 4,466,932 A | 8/1984 | Koyama et al. |
| 4,702,041 A | 10/1987 | Alder |
| 4,738,999 A | 4/1988 | Blenner et al. |
| 4,810,730 A | 3/1989 | Letinski et al. |
| 4,877,813 A | 10/1989 | Jinno et al. |
| 5,026,762 A | 6/1991 | Kida et al. |
| 5,139,863 A | 8/1992 | Alvarez et al. |
| 5,236,784 A | 8/1993 | Kobayashi et al. |
| 5,346,737 A | 9/1994 | Takahashi et al. |
| 5,360,633 A | 11/1994 | Dean |
| 5,432,213 A | 7/1995 | Kim et al. |
| 5,432,224 A | 7/1995 | Ryuhgoh et al. |
| 5,591,279 A | 1/1997 | Midorikawa et al. |
| 5,730,916 A | 3/1998 | Kunzel et al. |
| 5,762,699 A | 6/1998 | McGovern |
| 5,879,791 A | 3/1999 | Kato et al. |
| 5,916,499 A | 6/1999 | Murayama et al. |
| 6,075,099 A | 6/2000 | Stark et al. |
| 6,193,793 B1 | 2/2001 | Long et al. |
| 6,342,088 B1 | 1/2002 | Klatt et al. |
| 6,395,677 B1 | 5/2002 | Hokkirigawa et al. |
| 6,448,307 B1 | 9/2002 | Medoff et al. |
| 6,472,042 B1 | 10/2002 | Dibbern et al. |
| 6,494,928 B1 * | 12/2002 | Hokkirigawa et al. ........ 51/303 |
| 6,550,508 B1 | 4/2003 | Yamaguchi et al. |
| 6,573,215 B2 | 6/2003 | Hokkirigawa et al. |
| 2002/0111388 A1 | 8/2002 | Hokkiirigawa et al. |
| 2002/0114548 A1 | 8/2002 | Hokkirigawa et al. |
| 2002/0114549 A1 | 8/2002 | Hokkirigawa et al. |
| 2002/0152644 A1 | 10/2002 | Hokkirigawa et al. |
| 2002/0152694 A1 | 10/2002 | Hokkirigawa et al. |
| 2002/0152697 A1 | 10/2002 | Hokkirigawa et al. |
| 2002/0174605 A1 * | 11/2002 | Hokkirigawa et al. ........ 51/303 |
| 2002/0174771 A1 | 11/2002 | Hokkirigawa et al. |
| 2002/0175118 A1 | 11/2002 | Hokkirigawa et al. |
| 2002/0184605 A1 | 12/2002 | Hokkirigawa et al. |
| 2002/0192469 A1 | 12/2002 | Hokkirigawa et al. |
| 2003/0045222 A1 * | 3/2003 | Ohmori et al. ............. 451/546 |
| 2003/0134104 A1 | 7/2003 | Hokkirigawa et al. |
| 2003/0220421 A1 | 11/2003 | Hokkirigawa et al. |

FOREIGN PATENT DOCUMENTS

| | | |
|---|---|---|
| DE | 23 45 460 A1 | 3/1975 |
| DE | 19954227 A1 | 5/2001 |
| EP | 10095647 | 4/1998 |
| EP | 2002235016 | 2/2001 |
| EP | 1215407 A2 | 6/2002 |
| EP | 1 344 791 A1 | 9/2003 |
| GB | 920961 | 3/1963 |
| JP | 49-18458 | 2/1974 |
| JP | 03239475 A | 10/1991 |
| JP | 03239475 | 10/1991 |
| JP | 10 049714 A | 2/1998 |
| JP | 10-219031 A | 8/1998 |
| JP | 11021407 | 1/1999 |
| JP | 2000220117 A | 8/2000 |
| JP | 2000343438 A | 12/2000 |
| JP | 2000343438 | 12/2000 |
| JP | 2001089273 A | 4/2001 |
| JP | 2002284553 | 3/2002 |
| SU | 1 1835412 A1 | 2/2001 |
| WO | WO 93/23459 | 11/1993 |
| WO | WO 01/87793 A1 | 11/2001 |

OTHER PUBLICATIONS

European Search Report, Oct. 15, 2003.
European Search Report –Application No. EP 03 44 7156 Sep. 2003.
H. Iizuka et al., "Mechanical Properties of Porous Carbon Materials I.E. Woodceramics," 15 Journal of Materials Science Letters, 1770–72 (1996).
K. Hokkirigawa, "Wear Mode Map of Ceramics," Wear 151, pp. 219–228 Apr. 1991.
K. Hokkirigawa, "Wear Mode Map of Ceramics," Wear of Materials 353–358 (1991).
K. Adachi et al., "The Wear Mechanism of Silicon Nitride In Rolling–Sliding Contact," Wear of Materials, pp. 333–338 (1991).

(Continued)

Primary Examiner—Michael Marcheschi
(74) Attorney, Agent, or Firm—Joel Lutzker; Anna Vishev; Schulte Roth & Zabel LLP

(57) ABSTRACT

A superfinishing grindstone suitable for precision grinding, that contains either RB (rice bran) ceramic fine grains or CRB (carbonized rice bran) ceramic fine grains or a combination of both, for use as abrasive grains. The grains of RB ceramic fine grains and CRB ceramic fine grains have multiple small pores which allow the grains to be easily removed from a finished structure. These fine grains have a high Vickers hardness, which makes them highly resistant to bending, scratching, abrasion or cutting.

14 Claims, 2 Drawing Sheets

OTHER PUBLICATIONS

K. Hokkirigawa, "Advance Techniques For In–Situ Observations of Microscopic Wear Processes," Surface Modification Technologies VIII, pp. 93–105 (1995).

K. Adachi et al., "The Wear Mechanism of Silicon Nitride in Rolling–Sliding Contact," Wear, 151, pp. 291–300 (1991).

H. Kitsunai et al., "Transitions of Microscopic Wear Mechanism for Cr2O3 Ceramic Coatings During Repeated Sliding Observed in a Scanning Electron Microscope Tribosystem," Wear, 151, (1991) pp. 279–269.

K. Hokkirigawa, "Development and Application of Rice Bran Ceramics As A New Tribo–Material," Proceedings of the International Tribology Conference, Nagasaki, 2000, pp. 31–38.

K. Hokkirigawa et al., "Development of New Linear Dry Sliding Bearing By Using RB Ceramics," Proceedings of the International Tribology Conference, 2000, pp. 845–849.

K. Hokkirigawa, Friction and Wear Properties of New Tribo–Materials "RM Ceramics" Made From Rice Bran Proceedings of the International Tribology Conference, pp. 839–843 (2000).

T. Akagaki, "Friction and Wear of Woodceramics Under Oil and Water Lubricated Sliding Contacts," Journal of Porous Materials 6, pp. 197–204 (1999).

M. Imura et al., "Large Magnetoreistance Effect in Isotropic Polyscrystalline Perovskite–Like La–AM–Mu–O (AM=K, Rb) Ceramics," Journal of the Ceramic Society of Japan 104, pp. 151–154 (1996).

D.F. Diao, "Fracture Mechanisms of Ceramic Coatings in Indentation," Journal of Tribology (1994), pp. 860–869.

K. Zairyo, "Material Report R&D Development of Hard Porous Carbon Materials "RB Ceramics" by Using Rice Bran as Material," Functional Materials, May 1997, vol. 17, No. 5, pp. 24–28.

European Search Report –EP 03 07 5621 Jul. 2003.

European Search Report dated Jul. 8, 2004 re: EP 04 25 1399.

European Search Report dated Aug. 4, 2003 re: 03 25 1265.

European Search Report dated Oct. 15, 2003 re: EP 03 25 3554.

European Search Report dated Mar. 2, 2004 re: EP 03 25 3557.

XP002247972 cited in European Search Report date Aug. 4, 2004 re: 03251265.

XP002247973 cited in European Search Report date Aug. 4, 2004 re: 03251265.

XP002247952 cited in European Search Report re: 03075621 (no date).

XP002247953 cited in European Search Report re: 03075621 (no date).

XP002255669 cited in European Search Report re: 03447156 (no date).

European Search Report dated Aug. 4, 2004 re: 03005714.

* cited by examiner

SUPERFINISHING GRINDSTONE

CROSS-REFERENCE TO RELATED APPLICATIONS

This application claims all rights of priority to Japanese Patent Application No. 2002-164982 filed on Jun. 5, 2002 (pending).

BACKGROUND

The present invention relates to grindstones which are used in the finishing of the steel material of bearing race inner surfaces, rolling elements, and other types of sliding surfaces.

Typically, a plateau surface is required in the inner surfaces of roller bearing races, rolling elements, and other types of sliding surfaces from the point of view of the coefficient of friction, heat generation, lubricating oil retention, and seizure-resistant service life. Superfinishing grindstones have been developed to form these plateau surfaces, as recited in Laid-open Japanese Patent No. 3-239475. The superfinishing grindstone disclosed in the above patent essentially uses either silicon carbide, fused alumina abrasive grains or mixtures of these to a maximum of 80–95% of the volume when the whole volume of these grains of a grindstone is set at 100, and cubic boron nitride abrasive grains with an average grain size of 5–30 times over the mean abrasive grain size for the remaining 5–20%.

Further, Laid-open Japanese Patent No. 2000-343438 proposes a vitrified grindstone that contains carbonized bead-shaped grains which are used as a solid lubricant and not as the abrasive. They reduce cutting resistance and increase the cutting ability of diamond and CBN (cubic boron nitride) abrasives.

However, a detailed electron micrographic study of surfaces of steel material of bearing race inner surfaces, rolling elements, and other types of sliding surfaces which have been finished with conventional superfinishing grindstones revealed abrasive grains still stuck into the surface of sliding surfaces, and particularly alumina abrasive grains which were stuck in the finished surface or which had fallen out and left scratches in the surface.

No matter how small the abrasive grains may be, abrasive grains left sticking into the finished sliding surface are hard to remove by washing. Also, the hard abrasive grains can fall out while the bearing is in use, can become lodged between the sliding surfaces, and can seriously impede the performance of the bearing. The result is an increase in the production of defective parts.

SUMMARY OF THE INVENTION

The present invention was conceived to solve the problem of the prior art described above and its object is to provide a superfinishing grindstone suitable for precision grinding, that contains either RB (rice bran) or CRB (carbonized rice bran) ceramic fine grain or a combination of both, for use as abrasive grains.

As shown in FIG. 1, the grains of RB and CRB ceramic fine grains are carbon grains that have multiple small pores in their surfaces. As shown in FIG. 2, the molecular microstructure allows these abrasive grains to be easily removed from a finished structure.

The Vickers hardness, which determines resistance to bending, scratching, abrasion or cutting, of RB and CRB ceramic fine grains is not consistent and ranges between 400 and 1500. As shown in FIG. 2, these fine grains have a high Vickers hardness on a molecular level with the tips marked "S."

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
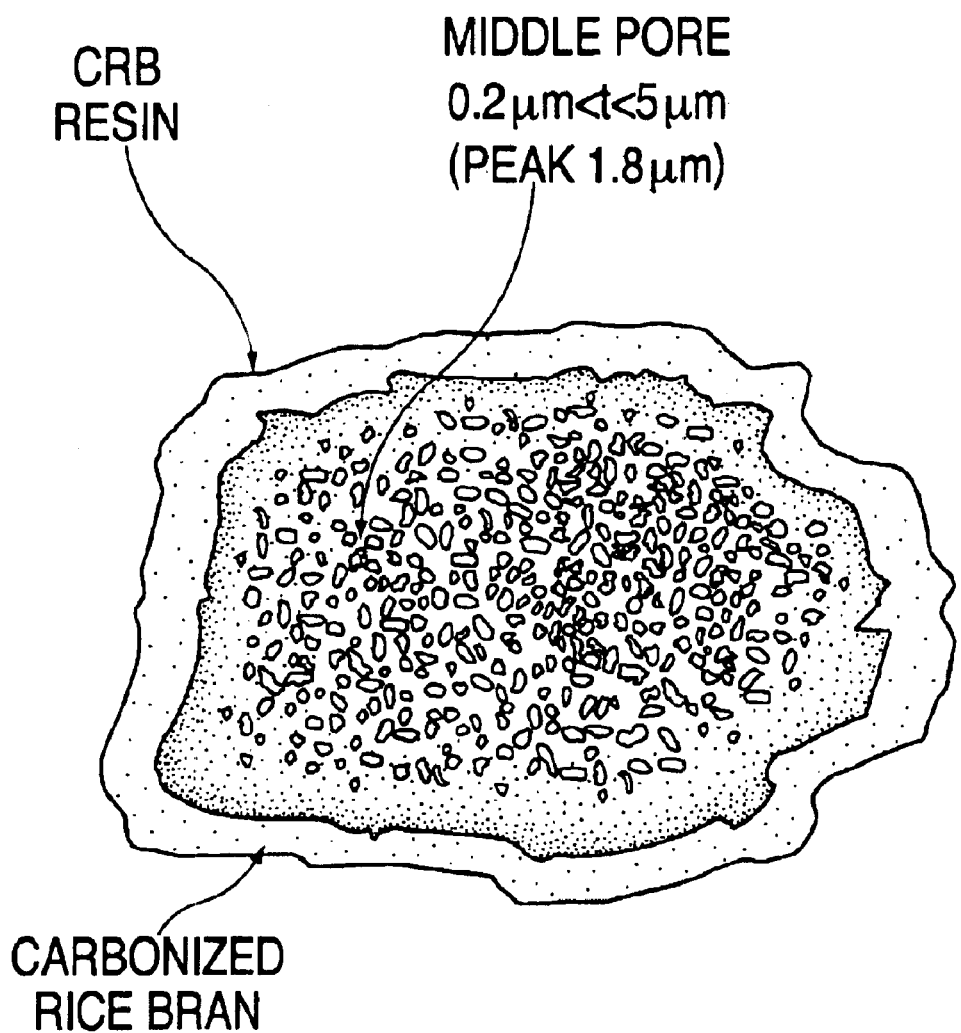
FIG. 1 is an electron micrographic photograph of the CRB fine grains used in this invention.
Figure 2:
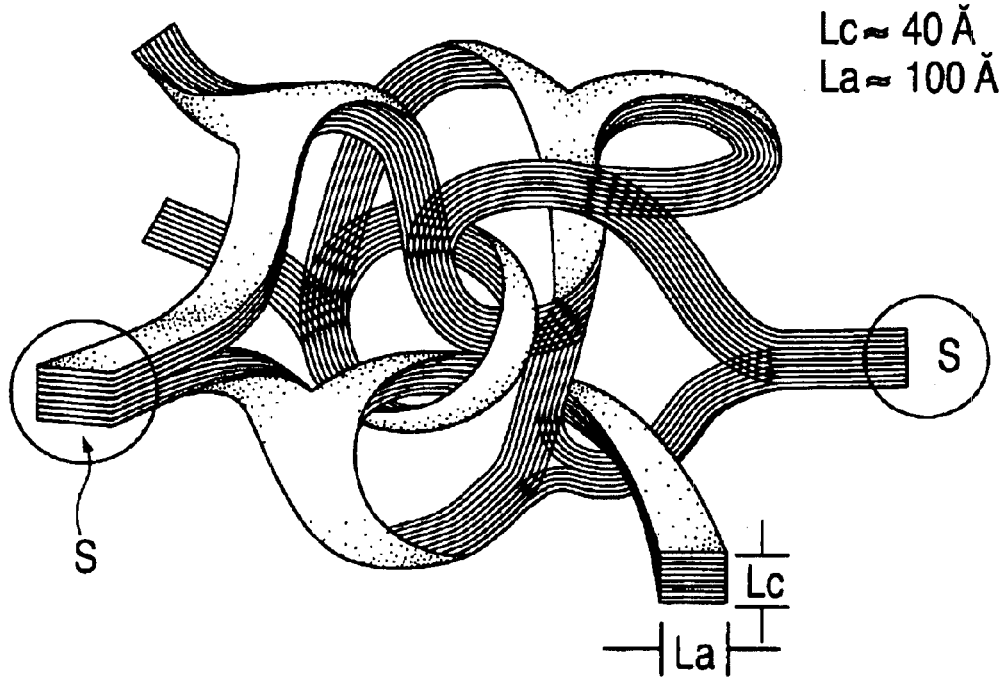
FIG. 2 is an schematic drawing of the carbonized phenolic resin of the CRB fine grain.

This invention solves the problems of prior art by providing a superfinishing grindstone, suitable for precision grinding and containing either RB or CRB ceramic fine grain or a combination of both, for use as abrasive grains.

The RB ceramic abrasive grains used in the superfinishing grindstone of this invention are porous carbon materials that use rice bran, and are known from research conducted by the first inventor of the present invention, Kazuo Hokirigawa. (See: Kinō Zairyō ["Functional Materials"], May 1997, Vol. 17, No. 5, pp.24–28 incorporated herein by reference.)

RB ceramics can be made from defatted rice bran obtained from rice bran which is blended with a thermosetting resin and the resulting compact is dried. The shaped material is then sintered in an inert gas atmosphere.

Any kind of thermosetting resin is acceptable. Typical thermosetting resins include phenolic resins, diaryl phthalate resins, unsaturated polyester resins, epoxy resins, polyimide resins, triazine resins, but phenolic resins are particularly suitable.

These resins can be used in combination with polyamide and other thermoplastic resins, as long as such use does not go beyond the scope of the invention.

The mixing ratio of defatted rice bran and thermosetting resin should be 50–90:50–10, and preferably is 70–80:30–20.

It is a known fact that the dimensions of the finished body, formed from RB ceramic material, after sintering in an inert gas atmosphere may shrink by as much as 25% compared to the dimensions of the pressure-formed body. Therefore, it is difficult to produce a precisely formed shape of the RB ceramic grain produced according to the above manufacturing method. Therefore, an improved ceramic—CRB ceramic—has been developed.

The following is a brief description of the CRB ceramic manufacturing method.

After defatted bran obtained from rice bran is kneaded together with a thermosetting resin and first sintered in an inert gas atmosphere at 700° C.–1000° C., it is crushed into a carbonized powder. After this carbonized powder is kneaded together with a thermosetting resin, it is heat-treated again at 600° C.–900°. Any kind of thermosetting resin is acceptable. Typical thermosetting resins are phenolic resins, diaryl phthalate resins, unsaturated polyester resins, epoxy resins, polyimide resins, triazine resins, but phenolic resins are particularly suitable. It is preferable that the thermosetting resin in the primary sintering is a liquid of relatively low molecular weight.

An ordinary rotary kiln is used for the primary sintering, and the sintering time is usually 40–120 minutes. The mass ratio of carbonized powder mixed with thermosetting resin for the primary sintering should be 50–90:50–10, but preferably is 70–80:30–20.

The mixed and kneaded material combining the carbonized powder and thermosetting resin is pressure-formed at a pressure of 20–30 MPa, and preferably at 21–25 MPa. The mold temperature should be approximately 150° C.

An electric furnace which can be adequately controlled is used for heat treatment, and the heat treatment time should be between 60–360 minutes.

The preferred heat treatment temperature is 500° C.–1100° C., and the temperature should be brought up slowly to 500° C. Specifically, the rate of temperature rise should be 0.5–2° C./minute, and preferably approximately 1° C./minute.

Also, after heat treatment has been completed, the temperature should be brought down slowly to the 500° C. level. The furnace can then be allowed to cool naturally below 500° C.

Specific cooling rates should be 0.5–4° C./minute, and preferably approximately 1° C./minute.

However, in making the RB or CRB ceramic which is used in this invention, the important thing is not so much to control the amount of time it takes to reach a certain temperature, but rather to control the temperature and to maintain it for the needed period of time.

Inert gases that can be used during the primary sintering and heat treatment are helium, argon, neon, or nitrogen gas, although nitrogen gas is preferred.

Further, the above-mentioned thermosetting resins can be used in combination with polyamide and other thermosetting resins, so long as such use does not exceed the parameters of the invention.

The most significant difference between RB and CRB ceramics is that RB ceramics have a finished form shrinkage rate of as much as 25%, while CRB ceramics are superior, having an extremely small shrinkage rate of 3% or less.

In this invention, either RB or CRB ceramic can be used as abrasive grains for precision grinding.

The properties of RB ceramics and CRB ceramics as abrasive grains are:

Vickers hardness of 400–1500.

The high-hardness spots on the surface of each and every grain are dispersed.

The grains can be elastically deformed.

Since the high-hardness spots are related to the molecular structure of the grains, the hard spots are found at a fixed proportion with no relation to particle size.

They are electrically conductive.

They are reducible.

Their desired grain size can be obtained according to the method of crushing.

Their hardness can be controlled by varying the heat treatment temperature.

RB and CRB ceramic abrasive grains have irregular surfaces, so they are very durable as abrasives.

An important feature of the RB and CRB ceramics used in this invention is the hardness of these materials. Basically, their hardness can be controlled by varying the sintering parameters, and they will generally increase in hardness when sintered at higher temperatures. The primary and secondary sintering temperatures have a significant effect on CRB ceramics, and a hard material will be obtained when it is sintered at a temperature from 600° C. to 900° C. Hardness can be determined according to the type of material to be ground, its use, and so on.

While there are no particular limitations on the superfinishing grindstone of this invention it must contain either RB or CRB ceramics or a combination of both as the abrasive grain. There are two basic types of grindstones. The first type is a grindstone that is made with a binder used to solidify the abrasive to produce a superfinishing grindstone. The second type is that the same manufacturing method must be used for both RB ceramics and for CRB ceramics so that when it is crushed it is carbonized due to the thermosetting resin.

The abrasive grain hardness and size of the RB and CRB ceramics used as the abrasive grains in the superfinishing grindstone of this invention can be varied depending on the application and purpose, but they are typically approximately 1–10 $\mu$m, and preferably in the range of 1–3 $\mu$m.

Other abrasive grains can be combined as needed with the RB and CRB ceramics, and can include diamond, boron nitride abrasives such as CBN and WBN, zirconia, silica, silicon carbide, iron oxides such as $Fe_2O_3$ or $—Fe_3O_4$, chrome oxide, or cerium oxide.

The mass ratio of RB ceramic abrasive grains and CRB ceramic abrasive grains to other abrasive grinding media should be 50–90:50–10, and preferably 50–80:50–20.

There are three types of binders used in one form of the superfinishing grindstone of this invention: resinoid bond grindstones using synthetic resins; metallic bond grindstones using metals; and vitrified bond grindstones using vitrified bonds.

The binders which can be used in resinoid bonds to fix the abrasive grains can be epoxy resins, phenolic resins, polyimide resins; polymer imide resins, unsaturated polyester resins, or other thermosetting resins.

The basic constitution of a vitrified bond is 40–70% by weight relative to the binder silica, 10–20% by weight alumina, boron oxide 10–20% by weight, 2–10% by weight calcium oxide and/or magnesium oxide, 2–10% by weight sodium oxide and/or potassium oxide, and small amounts of iron oxide and zinc oxide. The average grain size used in this invention is 1–15 $\mu$m.

Since the invention is pressure-sintered at a temperature from 600° C. to 900° C., the vitrified binding material powder mentioned above has to be able to fuse at these sintering temperatures. A typical example of the vitrified bonding material is boron silica glass.

The sintered material in the vitrified grindstone of this invention contains at least either RB or CRB ceramic abrasive grains, or a combination of both, well-known abrasive grains, and a vitrified bonding material, such that this vitrified bonding material is included as a vitrified bonding material matrix.

Pressure sintering methods that can be used include the traditional hot pressure method, hot coining, the resistance sintering electric heating sintering method, plasma discharge sintering, or the hot pressure method to which a pump is provided for vacuum pressure sintering.

In accordance with a first embodiment, in order to manufacture the CRB ceramic, 75 Kg of defatted rice bran obtained from rice bran is kneaded together with 25 Kg of liquid phenolic resin (resol) and heated to 50° C.–60° C. A homogeneous mixture is thus obtained.

The mixture is heated in a rotary kiln in a nitrogen atmosphere for 120 minutes at 700° C., thus performing the first baking. The obtained carbonized material is crushed into powder in a crushing mill and is then put through a ball mill to produce RB ceramic abrasive grains as a fine powder of 1–5 μm in average grain size.

In accordance with a second embodiment of the present invention, RB ceramic is prepared as in the first embodiment but the mixture is baked at 900° C. to obtain abrasive grains with an average grain size of 1–10 μm.

In accordance with a third embodiment and in order to manufacture the CRB ceramic, 75 Kg of defatted rice bran obtained from rice bran is kneaded together with 25 Kg of liquid phenolic resin (resol) and heated to 50° C.–60° C. A homogeneous mixture is thus obtained.

The mixture is heated in a rotary kiln in a nitrogen atmosphere for 100 minutes at 750° C., thus performing the first baking. The obtained carbonized material is crushed into powder in a crushing mill to produce a carbonized powder with an average grain size of 5–10 μm.

The resulting 75 kg of carbonized powder is kneaded together with 25 kg of solid phenolic resin (resol), while being heated to 100° C.–150° C. A homogenous material precursor to CRB ceramic is thus obtained.

This CRB ceramic precursor is pressure-formed at 20 MPa to produce a ball shape preferably sized at 3 cm. It receives a secondary baking at 700° C. in an electric furnace under a nitrogen atmosphere for a 3-hour period. The obtained carbonized material is crushed into powder in a crushing mill and is then put through a ball mill to produce CRB ceramic abrasive grains as a fine powder of 1–5 μm in average grain size.

In accordance with a fourth embodiment, CRB ceramic is prepared as in the second alternative embodiment but the first baking is performed at 750° C. and the second baking is performed at 700° C. to obtain abrasive grains with an average grain size of 1–5 μm.

In accordance with a fifth embodiment, the results of performance testing of the vitreous bond grindstone are shown in Table 1.

RB ceramic abrasive grains of the first four embodiments, CRB ceramic abrasive grains, commercially-available diamond abrasive grains with an average grain size 1–2 μm, and commercially available CBN abrasive grains with an average grain size 1–2 μm, were used with a vitrified binder for grindstones as the binding agent, in compositions as shown in Table 1 (relative volumes), and held for a period of 2 minutes at 650° C. in an air atmosphere in electric heat-pressurized fire to obtain a vitrified grindstone.

TABLE 1

| Raw Material | Embod. 1 | Embod. 2 | Embod. 3 | Embod. 4 | Embod. 5 |
| --- | --- | --- | --- | --- | --- |
| RB abrasive grains manufact. Ex. 1 | | 15.0 | | | |
| RB abrasive grains manufact. Ex. 2 | | | | 10.0 | 10.0 |
| CRB abrasive grains manufact. ex. 3 | 15.0 | | 10.0 | 22.0 | |
| CRB abrasive grains manufact. ex. 4 | | 10.0 | 10.0 | | 10.0 |
| Diamond abrasive grains | 20.0 | 10.0 | 15.0 | 20.0 | |
| CBN abrasive grains | 20.0 | 20.0 | 15.0 | | 30.0 |
| Vitrifying binder | 45.0 | 45.0 | 50.0 | 48.0 | 50.0 |

As shown in Table 2, the properties of the superfinishing grindstone thus obtained were examined in terms of the amount of the superfinishing, grindstone wear dimensions, and surface roughness. A prior art superfinishing grindstone (a borazon stone containing silica and alumina abrasive grains) was set as a standard at 100. The results were as shown in Table 2.

Grinding and dressing conditions were as follows: superfinishing grinding fluid flow rate is at 1.31/minute, material being ground is SUJ-2 (HRC-61), radial velocity of material being ground is 3.0 m/second, cycle time is 10 seconds, grindstone surface pressure is 3.0 MPa, pre-grinding roughness is 3S, grindstone vibrational frequency is 16.7/second, and grindstone amplitude is 1.5 mm.

TABLE 2

| | Embod. 1 | Embod. 2 | Embod. 3 | Embod. 4 | Embod. 5 | Prior Art example |
| --- | --- | --- | --- | --- | --- | --- |
| Amount of superfinishing | 125 | 110 | 113 | 120 | 108 | 100 |
| Wear dimensions | 106 | 103 | 103 | 106 | 101 | 100 |
| Surface roughness | 90 | 88 | 89 | 91 | 88 | 100 |

In accordance with alternative embodiments of the present invention, a shaped superfinishing grindstone is manufactured in which abrasive grains and thermosetting resin are carbonized together.

Abrasive grains were selected from the RB ceramics of the first four embodiments, CRB ceramic materials, commercially-available diamond abrasive grains (average grain size 1–2 μm), and commercially-available CBN abrasive grains (average grain size 1–2 μm). These materials were then kneaded together with solid phenolic resin (resol) at a temperature of 100° C.–150° C. to obtain a plastic, homogenous mixture.

This homogenous mixture was pressure-formed at 30 MPa to form a rectangular form 4 mm×9 mm×6 mm. This form was then sintered in an electric furnace in a nitrogen atmosphere, where the temperature was increased at a speed of approximately 1° C./minute until 500° C. was attained. The temperature was subsequently raised at a rate of 2° C./minute until a baking temperature of 700° C. was reached. Baking was for 1 hour at this temperature. The temperature was then reduced at a rate of 1° C./minute down to 500° C., and then the furnace was allowed to cool naturally. Carbonized sintered grindstones having the compositions shown in Table 3 were obtained.

TABLE 3

| Raw Material | Embod. 6 | Embod. 7 | Embod. 8 | Embod. 9 | Embod. 10 |
| --- | --- | --- | --- | --- | --- |
| RB abrasive grains manufact. ex. 1 | 15.0 | | | | |
| RB abrasive grains manufact. ex. 2 | | 15.0 | | | 25.0 |
| CRB abrasive grains manufact. ex. 3 | 15.0 | | 20.0 | 45.0 | |
| CRB abrasive grains manufact. ex. 4 | | 25.0 | 25.0 | | |
| Diamond abrasive grains | 20.0 | 10.0 | 15.0 | 20.0 | |
| CBN abrasive grains | 20.0 | 20.0 | 15.0 | | 30.0 |
| Vitrifying binder | 30.0 | 30.0 | 25.0 | 35.0 | 35.0 |

As shown in Table 4, the properties of the superfinishing grindstone thus obtained were examined in terms of the amount of the superfinishing, grindstone wear dimensions, and surface roughness. A prior art superfinishing grindstone (a borazon stone containing silica and alumina abrasive grains) was set as a standard at 100. The results were as follows:

TABLE 4

|  | Embod. 6 | Embod. 7 | Embod. 8 | Embod. 9 | Embod. 10 | Prior Art example |
|---|---|---|---|---|---|---|
| Amount of superfinishing | 130 | 116 | 116 | 122 | 110 | 100 |
| Wear dimensions | 111 | 104 | 103 | 107 | 102 | 100 |
| Surface roughness | 92 | 91 | 90 | 92 | 87 | 100 |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A superfinishing grindstone comprising first abrasive grains and a binder, wherein said first abrasive grains comprise a material selected from the group consisting of RB (rice bran) ceramic fine grains and CRB (carbonized rice bran) ceramic fine grains.

2. The superfinishing grindstone according to claim 1, wherein said first abrasive grains are combined with second abrasive grains selected from the group consisting of diamond abrasive grains, boron nitride abrasive grains, zirconium abrasive grains, silica abrasive grains, silicon carbide abrasive grains, iron oxide abrasive grains, chrome oxide abrasive grains and cerium oxide abrasive grains.

3. The superfinishing grindstone according to claim 1, wherein said first abrasive grains are combined only with diamond abrasive grains.

4. The superfinishing grindstone according to claim 1, wherein said first abrasive grains are combined only with boron nitride abrasive grains.

5. The superfinishing grindstone according to claim 2, wherein said first abrasive grains have an average grain size from 1 to 5 μm; and
wherein said second abrasive grains have an average grain size from 1 to 2 μm.

6. The superfinishing grindstone according to claim 1, wherein said binder is selected from the group consisting of a vitrified bond, a resinoid bond and a metallic bond.

7. A superfinishing grindstone comprising first abrasive grains and a binder,
wherein said first abrasive grains comprise a material selected from the group consisting of RB ceramic fine grains and CRB ceramic fine grains, and
wherein said binder comprises a vitrified bond.

8. A superfinishing grindstone comprising material obtained by steps of:
kneading together while heating a material selected from the group consisting of RB ceramic fine grains and CRB ceramic fine grains;
selecting one or more abrasive grains from the group consisting of diamond abrasive grains, boron nitride abrasive grains, zirconium abrasive grains, silica abrasive grains, silicon carbide abrasive grains, iron oxide abrasive grains, chrome oxide abrasive grains and cerium oxide abrasive grains;
selecting one or more thermosetting resins from the group consisting of phenolic resin, diaryl phthalate resin, unsaturated polyester resin, epoxy resin, polyimide resin and triazine resin;
mixing said material, said abrasive grain and said thermosetting resin to form a blend;
pouring said blend into a mold;
pressure forming said blend;
removing said blend from said mold;
heat-treating said blend at a temperature from 600° C. to 900° C.; and
cooling said blend.

9. The superfinishing grindstone according to claim 8,
wherein said thermosetting resin comprises a phenolic resin; and
wherein only said diamond abrasive grains are combined with said material selected from the group consisting of RB ceramic fine grains and CRB ceramic fine grains.

10. The superfinishing grindstone according to claim 8,
wherein said thermosetting resin comprises a phenolic resin; and
wherein only said boron nitride abrasive grains are combined with said material selected from the group consisting of RB ceramic fine grains and CRB ceramic fine grains.

11. The superfinishing grindstone according to claim 9, wherein each of said RB ceramic fine grains and said CRB ceramic fine grains has a mass ratio of 50–80:50–20 to said diamond abrasive grains.

12. The superfinishing grindstone according to claim 10, wherein each of said RB ceramic fine grains and said CRB ceramic fine grains has a mass ratio of 50–80:50–20 to said boron nitride abrasive grains.

13. The superfinishing grindstone according to claim 9,
wherein each of said RB ceramic fine grains and said CRB ceramic fine grains has an average grain size from 1 to 5 μm; and
wherein said diamond abrasive grains have an average grain size from 1 to 2 μm.

14. The superfinishing grindstone according to claim 10, wherein said boron nitride abrasive grains have an average grain size from 1 to 2 μm.

* * * * *